(12) United States Patent
Blöhbaum et al.

(10) Patent No.: US 12,169,242 B2
(45) Date of Patent: Dec. 17, 2024

(54) FMCW LIDAR DISTANCE MEASUREMENT APPARATUS

(71) Applicant: SICK AG, Waldkirch (DE)

(72) Inventors: Frank Blöhbaum, Denzlingen (DE); Christoph Menzel, Denzlingen (DE)

(73) Assignee: SICK AG, Waldkirch (DE)

( * ) Notice: Subject to any disclaimer, the term of this patent is extended or adjusted under 35 U.S.C. 154(b) by 296 days.

(21) Appl. No.: 17/728,585

(22) Filed: Apr. 25, 2022

(65) Prior Publication Data

US 2022/0342071 A1 Oct. 27, 2022

(30) Foreign Application Priority Data

Apr. 26, 2021 (EP) .................................... 21170473

(51) Int. Cl.
 *G01S 17/34* (2020.01)
 *B66C 13/46* (2006.01)
 *G01S 7/4912* (2020.01)
(52) U.S. Cl.
 CPC .............. *G01S 17/34* (2020.01); *B66C 13/46* (2013.01); *G01S 7/4917* (2013.01)
(58) Field of Classification Search
 None
 See application file for complete search history.

(56) References Cited

U.S. PATENT DOCUMENTS

| 10,421,646 | B2 | 9/2019 | Mannari et al. | |
| 2008/0174762 | A1* | 7/2008 | Liu | G01S 7/4817 356/17 |
| 2018/0170720 | A1* | 6/2018 | Mannari | G01S 7/481 |
| 2019/0064358 | A1* | 2/2019 | Desai | G01S 7/4911 |

(Continued)

FOREIGN PATENT DOCUMENTS

| CN | 105115587 A | 12/2015 |
| DE | 10065353 A1 | 2/2002 |

(Continued)

OTHER PUBLICATIONS

Dupuy ("Analysis of an avalanche photodiode used as an optoelectronic mixer for a frequency modulated continuous wave laser range finder," Dupuy et al, Journal of Optics A: Pure and Applied Optics, vol. 4, No. 6, Nov. 4, 2022) (Year: 2002).*

(Continued)

*Primary Examiner* — Uzma Alam
*Assistant Examiner* — Chad Andrew Reverman
(74) *Attorney, Agent, or Firm* — Nath, Goldberg & Meyer; Jerald L. Meyer; Tanya E. Harkins

(57) ABSTRACT

The present invention relates to an FMCW-LiDAR distance measurement apparatus in which a light source, in particular a laser, generates a frequency modulated transmission light beam as a transmission signal having a predetermined frequency deviation and transmits said frequency modulated transmission light beam into a measurement zone; a light receiver receives light reflected by objects in the measurement zone as a reception signal;

a mixer mixes at least a portion of the transmission signal with the reception signal and with an oscillator frequency to generate a mixed signal; and the oscillator frequency is adapted to a desired measurement zone to achieve a high measurement accuracy in the desired measurement zone.

19 Claims, 5 Drawing Sheets

(56) References Cited

U.S. PATENT DOCUMENTS

2019/0072672 A1* 3/2019 Yao .................. G01S 7/4814
2020/0182978 A1* 6/2020 Maleki ................ G01S 17/42

FOREIGN PATENT DOCUMENTS

| DE | 10112833 C1 | 3/2003 | | |
|---|---|---|---|---|
| DE | 10202399 A1 | 8/2003 | | |
| DE | 10251910 B4 | 3/2013 | | |
| EP | 0656868 B1 | 1/1997 | | |
| EP | 2574587 B1 | 6/2014 | | |
| EP | 3653563 B1 | 5/2020 | | |
| GB | 2307369 A | * | 5/1997 | ........... G01S 17/325 |

OTHER PUBLICATIONS

European Search Report for corresponding application 21170473.9 issued Oct. 14, 2021.

* cited by examiner

FMCW LIDAR DISTANCE MEASUREMENT APPARATUS

FIELD

The present invention relates to an FMCW LiDAR distance measurement apparatus for measuring large distances with a high measurement accuracy, in particular for use in port facilities or in large construction structures.

BACKGROUND

The measurement of large distances with a high accuracy places increased demands on corresponding distance measurement systems. Optoelectronic distance measurement systems are preferably used today. In particular distance measurement systems based on light detection and ranging (LiDAR) technology are widely used in this connection. A variant of LiDAR sensors are the so-called frequency modulated continuous wave (FMCW) LiDAR sensors that perform a distance measurement on the basis of a frequency modulated transmission signal. In comparison with time-of-flight (ToF) LiDAR sensors, FMCW LiDAR sensors have the advantage that they are more robust with respect to interference, such as incident sunlight.

Accordingly, LiDAR sensors are frequently used for the automation of crane systems in ports or for the monitoring of the movements of dams and bridges. In such environments, the measurement of large distances with a simultaneous high measurement accuracy is often required. In port facilities, for example, a measurement accuracy in the millimeter range is required for the docking procedure of a spreader of a crane to a container. However, strong vibrations can occur at the crane when loading containers. Due to the vibration load, the distance measurement apparatus therefore cannot be fastened directly to the spreader, for example. Instead, the distance measurement apparatus has to be fastened to a location less subject to vibration, for example, to a stationary object next to the crane. Large distances between the measurement object (i.e. the container) and the distance measurement apparatus thereby inevitably result. Despite the large distances, the distance measurement apparatus, however, still has to be able to provide the high measurement accuracy required.

The problem with conventional FMCW LiDAR systems is that the system-related measurement accuracy is in the centimeter range for large object distances of 150 m, for example. A realistic measurement accuracy at an object distance of 150 m is 9.4 cm, for example. The measurement accuracy of such systems by a factor of 100 is therefore too inaccurate for an application that requires a measurement accuracy in the millimeter range.

SUMMARY

It is therefore the underlying object of the invention to provide an FMCW LiDAR distance measurement apparatus in which an increased measurement accuracy can be achieved.

This object is satisfied by an FMCW LiDAR distance measurement apparatus in which an avalanche photodiode (APD) is configured to mix at least a portion of the transmission signal with the reception signal and with an oscillator frequency to generate a mixed signal.

The FMCW-LiDAR distance measurement apparatus comprises a light source, in particular a laser, that generates a frequency modulated transmission light beam as a transmission signal having a predetermined frequency deviation and transmits said frequency modulated transmission light beam into a measurement zone. The distance measurement apparatus comprises a light receiver that is configured to receive light reflected by objects in the measurement zone as a reception signal. The distance measurement apparatus further comprises a mixer that is configured to mix at least a portion of the transmission signal with the reception signal and with an oscillator frequency to generate a mixed signal, wherein the distance measurement apparatus is, for example, configured to adapt the oscillator frequency to a desired measurement zone.

In other words, a laser generates a frequency modulated transmission light beam as a transmission signal having a predetermined frequency deviation and transmits said frequency modulated transmission light into a measurement zone. The transmission light beam is reflected by objects in the measurement zone and the reflected light is received as a reception signal at the light receiver. A portion of the transmission signal can be mixed with the reception signal in the mixer to form a preliminary mixed signal that can furthermore be mixed with an oscillator frequency.

The frequency deviation can, for example, be generated in that the wavelength of the optical radiation of the transmission light beam is changed e.g. starting at a lower frequency (fu) up to an upper frequency (fo) (or vice versa) in a modulation time duration (Tmod). A measurement duration (Tmeas), during which the distance measurement apparatus determines the mixing frequency of the mixed signal, can correspond at most to the modulation time duration minus the time of flight (Ttof; back and forth) up to an object at the maximum measurement distance (Tmeas=Tmod−Ttof). The measurement duration is preferably shorter than 10 μs, particularly preferably shorter than 5 μs.

Thus, two signals having different frequencies are mixed during the mixing of the transmission signal and the reception signal. The frequency difference between the transmission signal and the reception signal in this respect depends on the distance of the reflecting object from the distance measurement apparatus. The greater the distance, the greater the frequency difference.

On the mixing (or also superposition) of the transmission signal and the reception signal, preliminary mixing frequencies e.g. result that correspond to the sum and the difference of the frequencies of the transmission and reception signal. The preliminary mixing frequency, which corresponds to the difference of the frequencies of the transmission and reception signal, is in particular processed further. This frequency is also designated as a beat frequency.

The time of flight and thus the distance of the object can be concluded from the beat frequency, which arises through the mixing, in particular after an analog-to-digital conversion of the mixed signal by an analog-to-digital converter (ADC).

It can be seen that the beat frequency increases as the object distance increases since an ever-increasing frequency difference between the transmission signal and the reception signal results as the object distance increases—due to the frequency deviation. For a high measurement accuracy, the frequency deviation also has to be selected as very large, which further increases the beat frequency. For example, with a required measurement accuracy of 1 mm at an object distance of 150 m, the beat frequency can be approximately 40 GHz, as will be explained in more detail in the following. However, frequencies in the range of 40 GHz can only be digitized and evaluated with a great effort and high costs.

The above-mentioned measurement accuracy (i.e. distance resolution) of 1 mm is now purely by way of example assumed for a maximum measurement distance of 150 m. The frequency deviation is in this respect defined as 200 GHz, wherein this frequency deviation is passed through within a modulation time duration of 5 μs. The so-called chirp rate thus results as 40 GHz/μs.

The time of flight to an object at a distance of 150 m amounts to 0.5 μs for the simple path. To and fro, a time of flight of 1 μs results that entails a frequency difference of the transmission and reception signal of 40 GHz. Accordingly, the beat frequency is likewise 40 GHz.

If the object distance now changes by 1 mm, the beat frequency changes by 0.267 MHz, that is by 0.000667%. This results in technical difficulties that can hardly be solved for the analog-to-digital conversion of the mixed signal (not only) from a cost aspect: The ADC would have to sample the mixed signal at a sampling frequency of at least 80 GHz to satisfy the sampling theorem. At a measurement duration of 4 μs, 320,000 sampled values result therefrom. The numerical values thus obtained would first have to be stored in a buffer at a data rate of 80 GHz and an FFT (Fast Fourier Transform) would have to be calculated to determine the value of the beat frequency. Neither ADCs nor memories are currently commercially available for such high data rates or sampling frequencies.

For this reason, the invention provides a mixing of the transmission and reception signal with the oscillator frequency. The oscillator frequency can e.g. be selected slightly higher than the beat frequency; 40.1 GHz could be used in the above example.

Due to the mixing with the oscillator frequency, the mixed signal is in particular produced with a mixing frequency that is the difference of the beat frequency and the oscillator frequency. At an object distance of 150 m, the mixing frequency amounts to 100 MHz (40.1 GHz-40.0 Ghz) in the above example. At an object distance of 149 m, the mixing frequency amounts to 366.7 MHz (40.1 GHz-39.7333 GHz).

If the object distance now changes by 1 mm, the mixing frequency of the mixed signal again changes by 0.267 MHz, which now corresponds to a change of 0.73%.

In a desired measurement zone, which extends by way of example from 149 m to 150 m, the mixing frequency is between 100 MHz and 366.7 MHz. Accordingly, the distance measurement apparatus can be configured to detect mixing frequencies in a predefined frequency range, wherein the predefined frequency range can be between 100 MHz and 400 MHz, for example. An ADC having a sampling frequency of, for example, 800 MHz can be used for this case. Such ADCs, including a dual-port RAM for a real-time storage of the data, are generally known. The method in accordance with the invention significantly reduces the demands on the hardware so that an implementation in an industrially suitable sensor system becomes possible.

If the object to be measured is clearly located outside the desired measurement zone, e.g. at more than 160 m, a distance measurement of the object can no longer be possible since the mixing frequency can then be outside the predefined frequency range.

In accordance with the invention, a very high measurement accuracy in the desired measurement zone is thus achieved with real available components. In this respect, the modulation time duration and/or the sampling frequency of the ADC can be kept constant during the measurement in the same desired measurement zone. For the adaptation of the desired measurement zone, the distance measurement apparatus can in particular be configured to change only the oscillator frequency and, for example, to leave the modulation time duration and/or the sampling frequency of the ADC unchanged. The adaptation of the desired measurement zone achieved in this manner can, for example, serve to locate an object.

Due to the change in accordance with the invention of the oscillator frequency, in particular the distance of the desired measurement zone from the distance measurement apparatus can be changed. In contrast, the size of the desired measurement zone (i.e. the extent, for example an extent of 1 m in the range from 149 m to 150 m) and/or the measurement accuracy in the desired measurement zone can remain the same on a change of the oscillator frequency alone. In return for the high measurement accuracy, however, the possibility of a measurement—without changes to the distance measurement apparatus or e.g. to the modulation time duration or the sampling frequency of the ADC—over a wide range of distances is omitted.

To adapt the distance measurement apparatus to different measurement zones (i.e. desired measurement zones), provision is made in accordance with the invention to adapt the oscillator frequency to the desired measurement zone. In this respect, the modulation time duration and/or the sampling frequency of the ADC in particular remains/remain constant. If—in the above example—a measurement now takes place at an object distance of 120 m, i.e. in a desired measurement zone of e.g. 119 m-120 m, the oscillator frequency can be set to 32.1 GHz (a beat frequency of 32 Ghz results at an object distance of 120 m). Mixing frequencies between 100 MHz and 366.7 MHz are then again adopted for the desired measurement zone of 119 m-120 m. Since they are the same mixing frequencies, they can be detected by the existing components without an adaptation.

The distance measurement apparatus in accordance with the invention thus combines a high measurement accuracy (even at large distances) with a settability of the desired measurement zone.

The desired measurement zone can e.g. be received from external via a data signal, whereupon the oscillator frequency is then adapted to the desired measurement zone. Thereafter, distance measurements can then take place by means of the distance measurement apparatus.

Further aspects of the distance measurement apparatus will be explained in the following.

The measurement zone is preferably the region in which the FMCW-LiDAR distance measurement apparatus can transmit the transmission light beam, wherein the measurement zone extends up to a maximum measurement distance at which a distance measurement of an object is still just possible. The measurement zone can, for example, be limited in that light reflected outside the maximum measurement distance can no longer be detected by the light receiver. The desired measurement zone is preferably at least partly located within the measurement zone.

The desired measurement zone can, for example, be exactly one measurement distance or one measurement window. The extension/extent of the desired measurement zone is usually comparatively small with respect to the maximum measurement distance of the distance measurement apparatus. For example, the extension of the desired measurement zone amounts to less than 2% or less than 1% of the maximum measurement distance of the distance measurement apparatus.

In accordance with a further embodiment, the distance measurement apparatus is configured to adapt a modulation time duration, a sampling frequency of the ADC, and the oscillator frequency to the desired measurement zone independently of one another or in dependence on one another.

For example, the modulation time duration and, if necessary, the measurement duration can be extended for the determination of the distance of objects in a larger desired measurement zone (i.e. in a desired measurement zone having a larger extent). In addition, the oscillator frequency for mixing with the transmission and reception frequency and the sampling frequency of the ADC can be reduced. The modulation time duration, the sampling frequency of the ADC, and the oscillator frequency can preferably be adapted in dependence on one another such that the number of data points provided by the ADC remains constant during the measurement duration. In another example, the modulation time duration, the oscillator frequency, and the sampling frequency can be set independently of one another. In other words, the modulation time duration, and/or the sampling frequency of the ADC, and/or the oscillator frequency can be adapted to the desired measurement zone.

Thus, the modulation time duration can e.g. be extended from 5 μs to 50 μs for the interval of 110 m-120 m. A maximum beat frequency of 3.2 GHz thus results. The maximum change of the beat frequency on a change of the distance of the object from 120 m to 110 m is now 266.7 MHz in this example. The frequency of the oscillator signal is now e.g. set to 3.21 Ghz so that mixing frequencies of 10 MHz-277.7 Mhz result. The sampling frequency and the measurement duration can be kept constant. Alternatively, the sampling frequency of the ADC can be reduced by a factor of 10 for this example, wherein, at the same time, the measurement duration can likewise accordingly be extended by a factor of 10.

For the coarse locating of the object, the parameters modulation time duration, oscillator frequency for the mixing with the transmission and reception signal, and the sampling frequency of the ADC can, for example, be changed independently of one another or in dependence on one another such that an interval nesting of the measurement zone to be monitored takes place and the measurement value resolution is adapted to the respective requirements in the process.

In accordance with a further embodiment, the distance measurement apparatus is configured to adapt the modulation time duration, the sampling frequency of the ADC, and the oscillator frequency in a first phase to a larger desired measurement zone and in a subsequent second phase to a smaller desired measurement zone. In this respect, "larger" and "smaller" refer to the size of the extent of the desired measurement zone.

This means that e.g. with a coarse resolution of e.g. 10 cm in a larger desired measurement zone, the object is searched for and the oscillator frequency and/or the sampling frequency and/or the modulation time duration and the measurement duration are subsequently switched in accordance with the higher requirements of the distance resolution (e.g. a distance resolution of 1 mm) in a smaller desired measurement zone.

This process can take place in an automatic and/or adaptive manner. For example, the distance measurement apparatus can adapt the oscillator frequency and/or the sampling frequency and/or the modulation time duration and/or the measurement duration to a larger desired measurement zone for the coarse locating of the object and, after a first distance measurement, can automatically adapt the oscillator frequency and/or the sampling frequency and/or the modulation time duration and/or the measurement duration to a smaller desired measurement zone corresponding to the first distance measurement. Conversely, the distance measurement apparatus can adapt the oscillator frequency and/or the sampling frequency and/or the modulation time duration and/or the measurement duration to a smaller desired measurement zone and, after a first distance measurement, can automatically adapt the oscillator frequency and/or the sampling frequency and/or the modulation time duration and/or the measurement duration to a larger desired measurement zone.

The modulation of the transmission signal can e.g. take place by a tunable light source. The frequency deviation of the transmission signal can be fixedly predefined. Accordingly, the frequency deviation is in particular not automatically changeable in order to prevent undesired effects in the optics.

Further embodiments of the invention can be seen from the description, from the dependent claims, and from the drawings.

In accordance with a first embodiment, the mixer of the FMCW LiDAR distance measurement apparatus comprises a photodiode that mixes at least a portion of the transmission signal and the reception signal and converts them into an electrical signal. The photodiode can also serve to receive the light reflected by objects from the measurement zone. Accordingly, the light receiver and the mixer can be formed as a common component. The beat frequency arises during the mixing of the transmission and reception signal and is mixed, preferably electrically mixed, with the oscillator frequency. The mixing of the transmission signal and the reception signal preferably takes place by a superposition on the photodiode, that is, it can also take place partly optically.

In accordance with a further embodiment, the mixer can comprise an avalanche photodiode (APD) that is configured to perform the mixing of at least a portion of the transmission signal and the reception signal and a bias voltage of the APD acted on by the oscillator frequency. Accordingly, the above-mentioned photodiode can be configured as an APD.

Due to the action on the bias voltage of the APD, the mixing of two optical signals and one electrical signal can take place in one component, namely the APD. Due to the smaller number of components used, this embodiment is particularly space-saving and cost-efficient.

In general, the mixing of the transmission and reception signal and the oscillator frequency can take place in any desired manner, in particular also separately from the APD.

In addition, the transmission signal and/or the reception signal and/or the mixed signal can be amplified before and/or after the mixing.

In accordance with a further embodiment, the oscillator frequency is generated by a local oscillator. The oscillator frequency is in this respect adaptively set to a beat frequency expected for the desired measurement zone.

The local oscillator is preferably an electrical oscillator. The expected beat frequency can correspond to the beat frequency of exactly one distance from the desired measurement zone, preferably to the largest or smallest distance from the desired measurement zone.

In accordance with a further embodiment, the distance measurement apparatus is configured to switch between at least two desired measurement zones during operation and to adapt the oscillator frequency to the (currently valid) desired measurement zone. The switchover can take place during ongoing operation, for example, a first measurement can be performed with a first desired measurement distance and a subsequent second measurement can be performed with a second desired measurement distance. The oscillator frequency is in particular set before the performance of a respective measurement.

In accordance with a further embodiment, a distance range is defined by the desired measurement zone, said distance range having a minimum distance value with an associated minimum beat frequency and a maximum distance value with an associated maximum beat frequency. The distance measurement apparatus is configured to select the oscillator frequency such that the oscillator frequency is greater than the maximum beat frequency or less than the minimum beat frequency. The oscillator frequency is usually selected slightly, e.g. 100 MHz or 1.0% or 0.5%, different from the maximum/minimum beat frequency.

In accordance with a further embodiment, the frequency deviation of the frequency modulated transmission light beam has a periodic, piecewise linear shape. For example, the frequency deviation, i.e. the frequency of the transmission light beam viewed over time, has the shape of a sawtooth function or triangular wave function. However, the frequency deviation can comprise any other periodic, piecewise linear function. The frequency deviation can further have a periodic, non-linear shape.

In accordance with a further embodiment, the distance measurement apparatus has an analog-to-digital converter (ADC) that converts the mixed signal into a digital mixed signal. The distance measurement apparatus is preferably configured to convert the digital mixed signal into the frequency range by means of a fast Fourier transformation. The frequency portions of the mixed signal can be determined by the fast Fourier transformation. The fast Fourier transform is preferably performed in a digital space, for example by a DSP (digital signal processor).

In accordance with a further embodiment, a mixing frequency of the mixed signal and/or of the digital mixed signal is determined in the frequency range. The frequency portion that has the strongest weighting in the mixed signal and/or in the digital mixed signal can, for example, be used as the mixing frequency. Based on the determined mixing frequency, the beat frequency and the distance from a respective object in the measurement zone can be determined. The distance from the object determined in this way can be output as a distance measurement value.

As already indicated above, both the mixing of the transmission and the reception signal and the mixing of the beat frequency with the oscillator frequency result in the generation of additive and subtractive further frequencies, wherein the additive further frequencies are each filtered out by means of a low-pass filter since these frequencies are not processed further.

In accordance with a further embodiment, the desired measurement zone is set based on a received data signal, for example, a received data signal from peripheral systems and/or sensors. Such sensors can, for example, be other distance measurement sensors that already perform a rough measurement and send the result of the rough measurement to the distance measurement apparatus. The sensors can, for example, comprise LiDAR sensors, radar sensors, camera sensors, or any other type of suitable sensors. The peripheral systems can, for example, comprise a crane control, wherein an approximate position of the crane can already be known through the crane control and the desired measurement zone can be set based on the approximate position of the crane.

In accordance with a further embodiment, the transmission and reception signal are transmitted and/or received via a common optics. The common optics can comprise a circulator that guides the transmission light beam predominantly into the measurement zone and partly to the light receiver and that supplies the reflected light to the light receiver. The circulator can therefore, for example, guide a small portion of the transmission light beam to the light receiver (e.g. between 0.01% and 1% or between 1% and 5% of the light power) so that the beat frequency can be determined based on the small portion of the transmission light beam and the reception signal.

The distance measurement apparatus in accordance with the invention can have a measurement accuracy better than 4 mm, 2 mm, 1 mm, or 0.5 mm at a distance of 150 m, for example. The distance measurement apparatus can have a frequency deviation of at least 100 GHz, 200 GHz, or greater. The beat frequency can, for example, be greater than 10 GHz, 20 GHz, or 40 GHz. The desired measurement window can be smaller than 2 m, 1 m, or 0.5 m. These numerical values serve purely as an example to illustrate the possible frequencies used and achievable accuracies.

A further subject of the invention is a crane system comprising a crane. The distance measurement apparatus explained herein can be part of the crane system. The crane is preferably a gantry crane, in particular a container gantry crane. The distance measurement apparatus can in this respect be attached in such a manner to detect a position of at least one movable part of the crane. A crane control can be configured to transmit an (approximate) position of a movable part of the crane as a data signal to the distance measurement apparatus, whereupon the distance measurement apparatus sets the desired measurement zone based on the transmitted position.

The gantry crane is in particular a crane comprising a frame that is set up such that it is movable on two tracks. Two supports in the side regions of the frame are preferably connected by a bridge, wherein a crab is movably arranged on the bridge and moves transversely to the two-track direction of travel.

A spreader can be lowered from the crab to hook onto containers and to transport the containers. The distance measurement apparatus can serve to determine the exact position of a spreader and/or of a container to be transported, for example. The crane can then in turn deduce from the position of the spreader and/or of the container whether the spreader is in the correct position relative to the container in order to hook onto the container.

In the case of cranes, very strong vibrations can occur during operation for which the distance measurement apparatus is not designed. For this reason, the distance measurement apparatus can be attached to a non-movable part, in particular of the crane or of the crane system, in accordance with an embodiment. The non-movable part of the crane system can be a stationary part of the crane or of the crane system. Due to the positioning of the distance measurement apparatus at a stationary part of the crane system, high measurement distances can result that can be detected with a high accuracy by means of the distance measurement apparatus in accordance with the invention.

A further subject of the invention is a construction structure, for example, a bridge or a dam. The construction structure comprises the distance measurement apparatus explained herein. The distance measurement apparatus is configured to repeatedly measure at least one position (i.e. a distance from the distance measurement apparatus) of a part of the construction structure. The distance measurement apparatus can, for example, detect slight changes in the position of the bridge (e.g. due to loads by vehicles) or of the dam (e.g. in the case of an increased water pressure). In this respect, very precise measurements having a measurement accuracy of millimeters have to be performed at a large distance (of e.g. 100 m), for which purpose the distance measurement apparatus explained here is particularly suitable.

Finally, a further subject of the invention is an FMCW LiDAR distance measurement method in which
- a frequency modulated transmission light beam is generated as a transmission signal and is transmitted into a measurement zone, wherein the transmission signal has a predetermined frequency deviation,
- light reflected by objects in the measurement zone is received as a reception signal,
- at least a portion of the transmission signal is mixed with the reception signal and with an oscillator frequency to generate a mixed signal,
- in particular the oscillator frequency is adapted to a desired measurement zone.

The statements regarding the FMCW LiDAR distance measurement apparatus in accordance with the invention accordingly apply to the FMCW LiDAR distance measurement method; this in particular applies with respect to advantages and embodiments.

BRIEF DESCRIPTION OF THE DRAWINGS

The invention will be presented purely by way of example with reference to the drawings in the following. There is shown.

DETAILED DESCRIPTION

Figure 1:
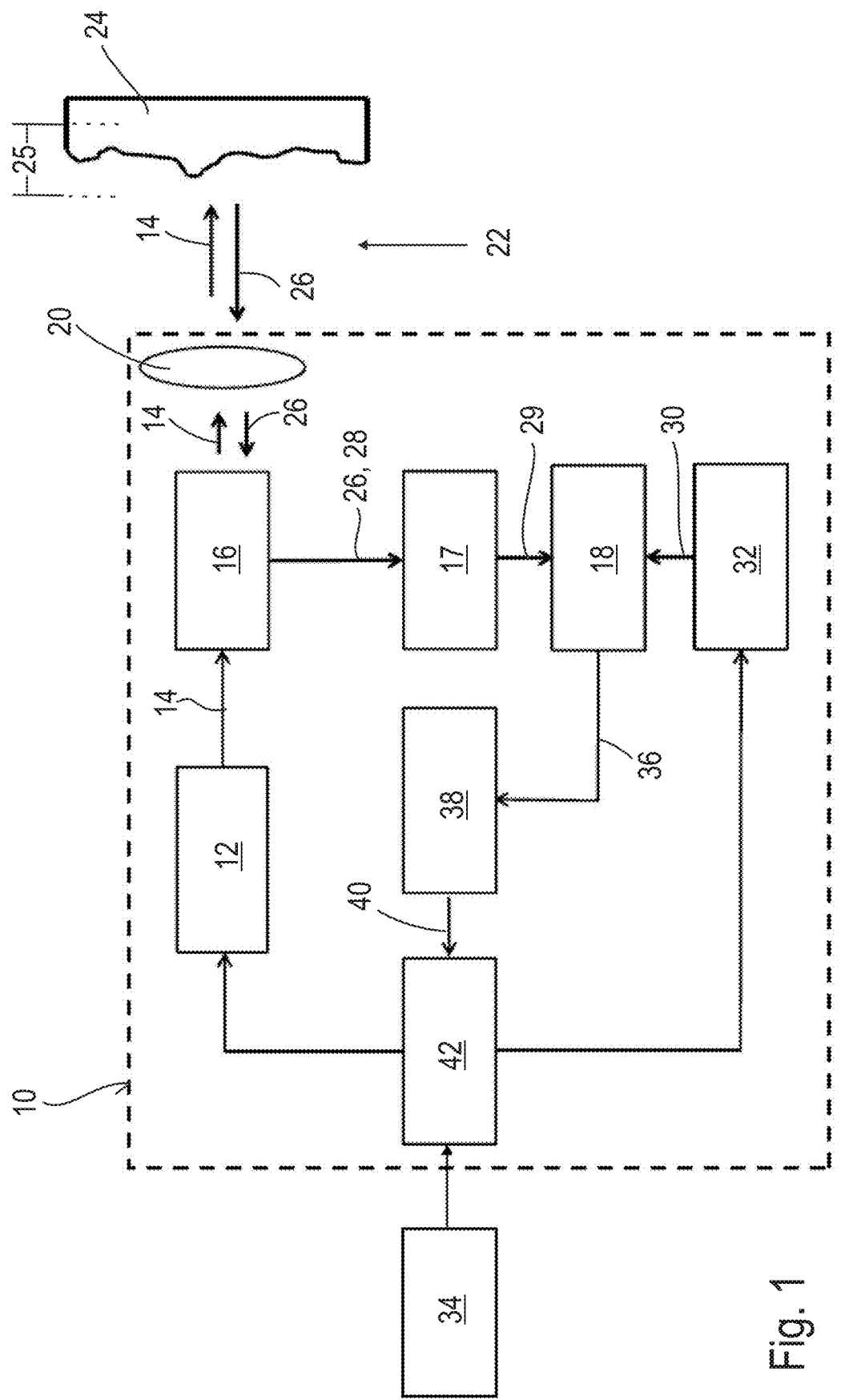
FIG. 1 schematically, the design of an FMCW-LiDAR distance measurement apparatus in accordance with a first embodiment.

FIG. 1 shows a FMCW LiDAR distance measurement apparatus 10 in accordance with a first embodiment. The distance measurement apparatus 10 comprises a laser 12 that generates a frequency modulated transmission light beam as a transmission signal 14 having a predefined frequency deviation. A portion 28 of the transmission signal 14 is conducted to a photodiode 17 via a circulator 16, while a large portion of the transmission signal 14 is transmitted into a measurement zone 22 via the circulator 16 and via a transmission and reception optics 20.

The transmission signal 14 impacts an object 24 in the measurement zone 22 and is reflected by the object 24 as a reception signal 26. The object 24 is disposed in a desired measurement zone 25.

Via the transmission and reception optics 20 and the circulator 16, the reception signal 26 is likewise conducted to the photodiode 17, where the reception signal 26 is mixed together with the portion 28 of the transmission signal 14 to form a preliminary mixed signal 29 and the preliminary mixed signal 29 is amplified by an amplifier, not shown.

A difference frequency, the beat frequency 52 (FIG. 2), which arises in the preliminary mixed signal 29 through the mixing of the transmission signal 14 (or the portion 28 of the transmission signal 14) and the reception signal 26, is additionally mixed with an oscillator frequency 30, which is provided by a local oscillator 32, in a mixer 18 such that the beat frequency 52 is mixed down to a low frequency range.

The oscillator frequency 30 is in this respect adapted in accordance with the desired measurement zone 25. The desired measurement zone 25 can, for example, be predefined by a peripheral system 34 such as a crane control or other distance measurement sensors.

A beat frequency 52 of, for example, 40 GHz, which e.g. arises at a distance of 150 m during the distance measurement of an object 24, can be mixed with an oscillator frequency 30 of 40.1 GHz such that a mixed signal 36 that is produced in the process has a frequency of only 100 MHz. Additive mixing frequencies can be suppressed by means of a low-pass filter, not shown.

The mixed signal 36 can be converted into a digital mixed signal 40 via an ADC (analog digital converter) 38 and can be converted into the frequency range by means of a control unit 42 that performs a fast Fourier transformation of the digital signal 40. The use of expensive ADCs, which process high frequencies, is thus not necessary.

The control unit 42 can furthermore be configured to output the result of the distance measurement and to perform the adaptation of the oscillator frequency 30 based on the desired measurement zone 25. For this purpose, the control unit 42 can be coupled to the peripheral system 34 via a data link.

Figure 2:
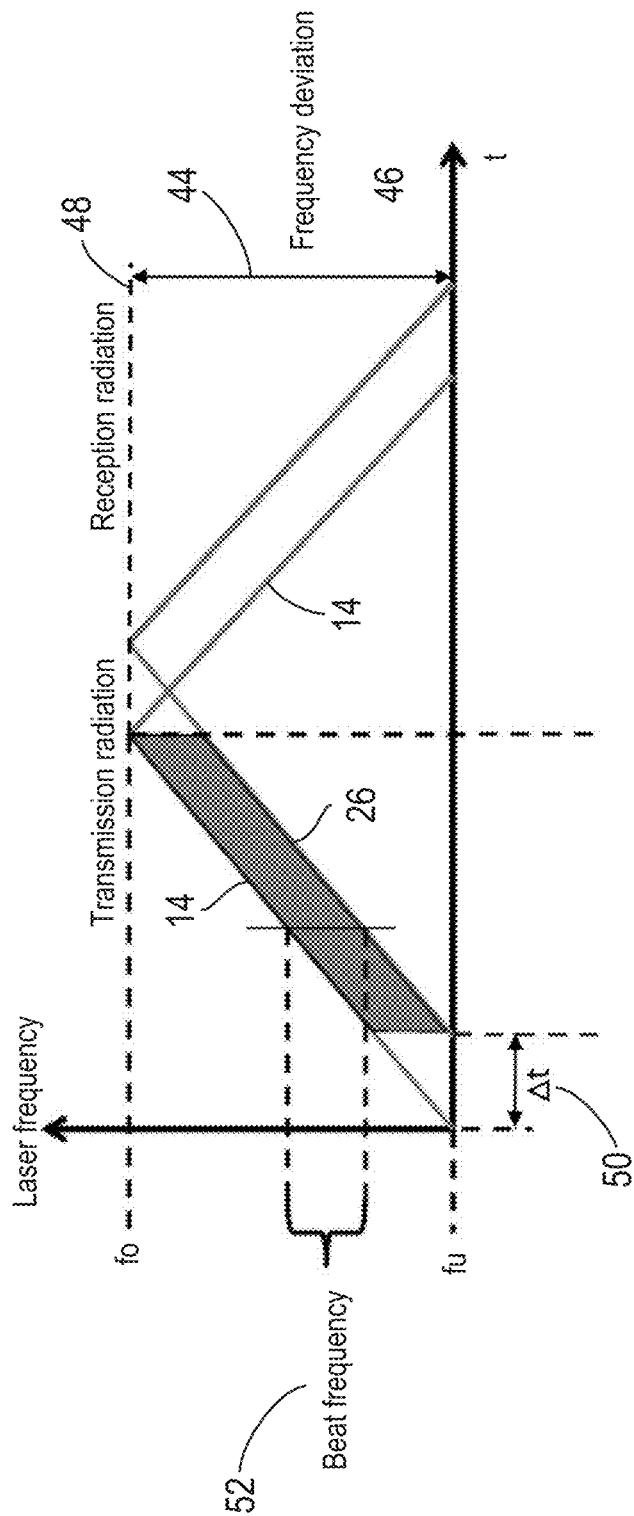
FIG. 2 schematically, the laser frequencies of the transmission signal and the reception signal.

FIG. 2 shows the laser frequencies of the transmission signal 14 and the reception signal 26. The frequency deviation 44 of the two signals extends from a lower frequency (fu) 46 to an upper frequency (fo) 48. The laser frequency of the transmission signal 14 and the laser frequency of the reception signal 26 are offset by a time interval (Δt) 50 in the x axis direction and by a beat frequency 52 in the y axis direction.

The arising beat frequency 52 and also the frequency of the mixed signal 36 are directly dependent on the time interval Δt 110 which the transmission signal required to travel the distance from the distance measurement apparatus 10 to the object 24 and from the object 24 back to the distance measurement apparatus 10, and thus allow conclusions about the distance of the object 24.

Figure 3:
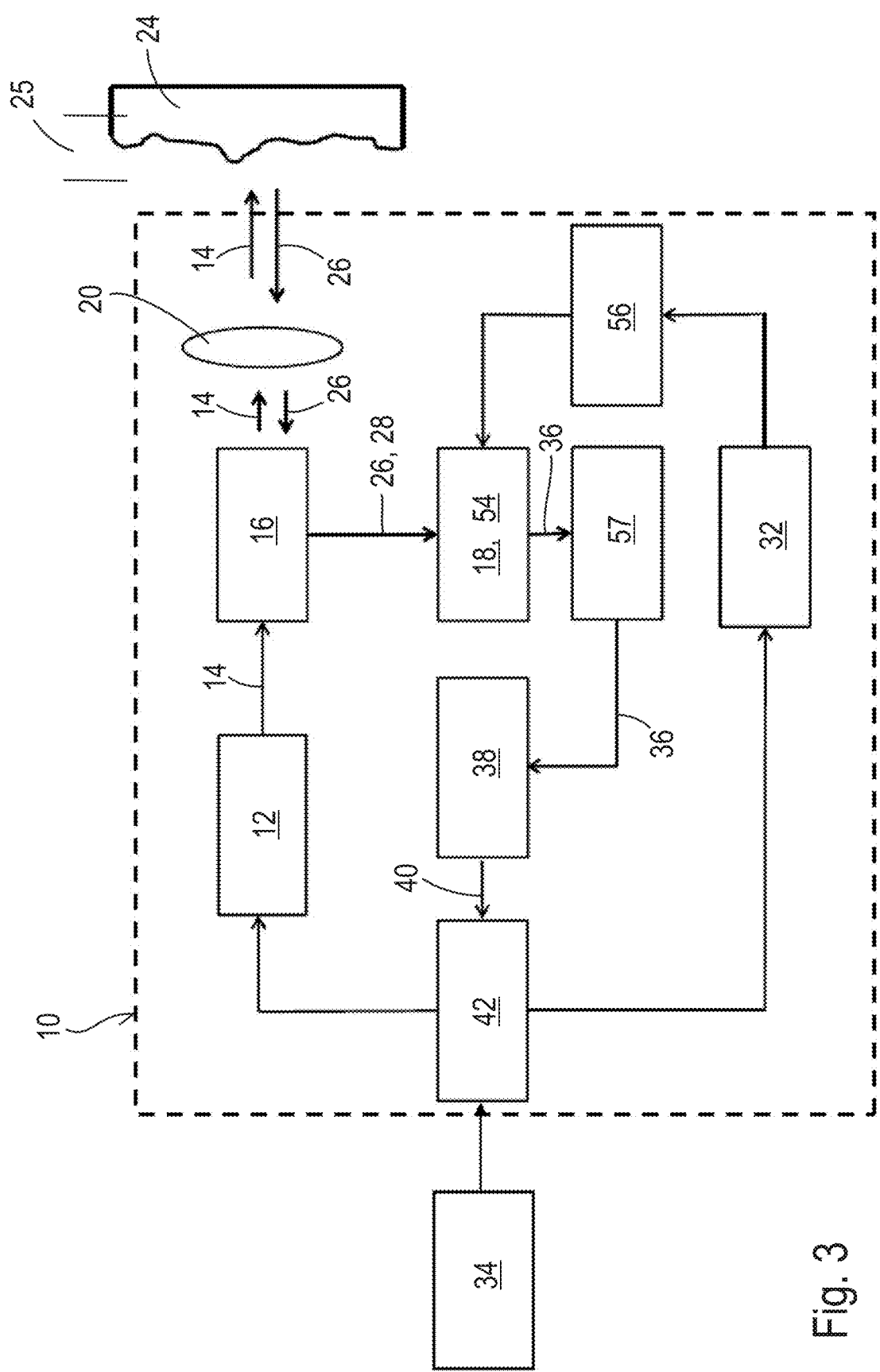
FIG. 3 a second embodiment of the FMCW LiDAR distance measurement apparatus comprising an avalanche photodiode (APD)

In FIG. 3, a second embodiment of the FMCW LiDAR distance measurement apparatus 10 is shown that, in contrast to the first embodiment, uses an APD (avalanche photodiode) 54 as a mixer 18, said APD 54 performing the mixing of the transmission and reception signals 14, 26 with an APD bias voltage 56 acted on by the oscillator frequency 30. In this embodiment, the mixing of two optical signals and an electrical signal takes place in one component, namely the APD 54. Accordingly, the APD 54 provides the mixed signal 36 as an output signal, said mixed signal 36 being supplied to the ADC 38 as in the first embodiment. Another amplifier 57, which amplifies the mixed signal 36, is also shown in front of the ADC 38 in FIG. 3. The advantage of a design with the APD 54 is that both space and costs are saved due to a reduced use of components.

Figure 4:
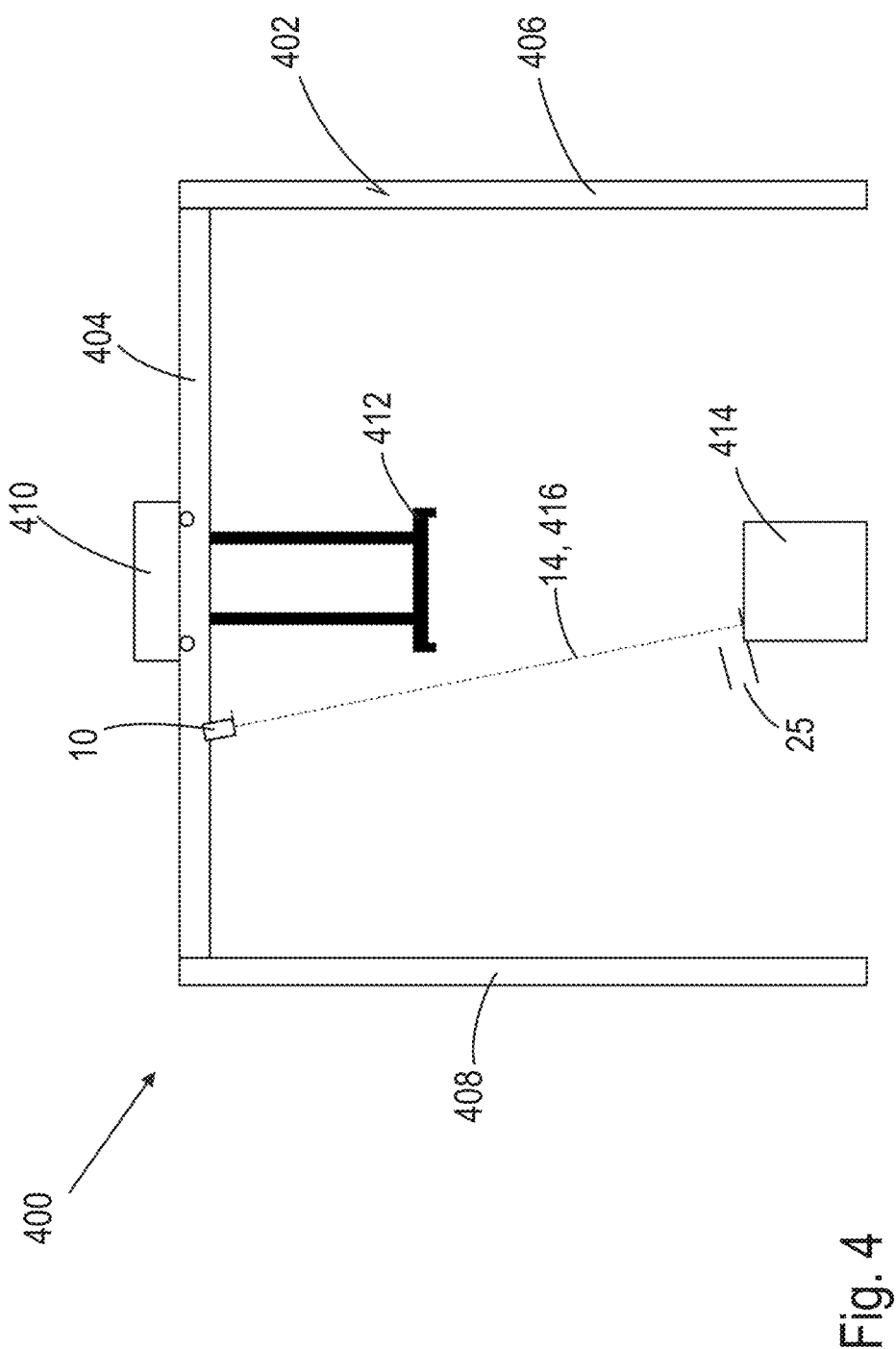
FIG. 4 a crane system comprising the FMCW LiDAR distance measurement apparatus.

FIG. 4 shows a crane system 400 in which the FMCW LiDAR distance measurement apparatus 10 is used. The crane system 400 comprises a gantry crane 402, a crane bridge 404, two supports 406, 408, a crab 410, a spreader 412, a container 414, and the FMCW LiDAR distance measurement apparatus 10 that transmits the transmission light beam as a transmission signal 14 in order to measure a measurement distance 416.

The FMCW LiDAR distance measurement apparatus 10 is attached to the crane bridge 404 that connects the two supports 406, 408 to one another. The crab 410 can be moved over the crane bridge 404 to adopt a position along the crane bridge 404. The spreader 412, which serves to pick up and place the container 414, is arranged at the crab 410.

The FMCW LiDAR distance measurement apparatus 10 measures the measurement distance 416 between the container 414 and the distance measurement apparatus 10 and transmits the measured data to a control and automation system of the crane system 400 that is not shown and that controls the movement of the spreader 412. The control and automation system of the crane system 400 can transmit data to the distance measurement apparatus 10 that comprise information about an approximate position or distance of the object 24 to be measured (i.e. of the container 414). The distance measurement apparatus 10 can use this data to adapt the oscillator frequency 30 of the distance measurement apparatus 10 in such a manner that the desired measurement zone 25 is set such that the docking of the spreader 412 at the container 414 can be monitored.

Figure 5:
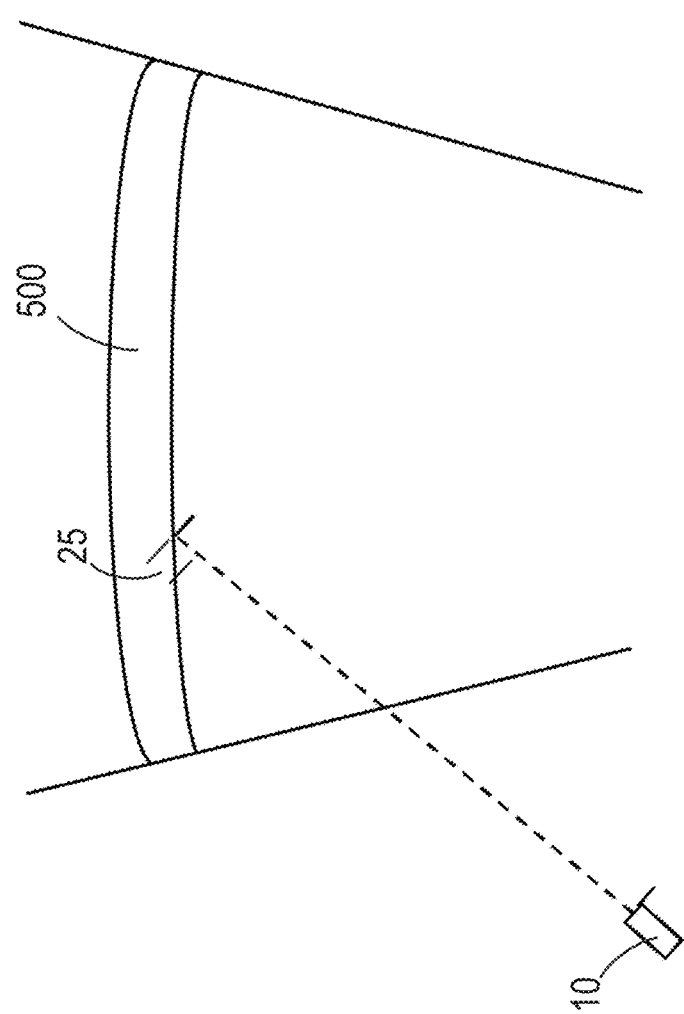
FIG. 5 a dam comprising the FMCW LiDAR distance measurement apparatus.

A dam 500 and a distance measurement apparatus 10 are schematically shown in FIG. 5. The distance measurement apparatus 10 detects the distance from a part of the dam 500 at regular intervals to identify a movement of the dam 500 in this manner. The distance measurement apparatus 10 can be set in advance to a desired measurement zone 25 that makes it possible to detect slight movements of the dam 500. The distance measurement apparatus 10 can transmit measurement data to a warning system of the dam 500 that is not shown and that outputs a warning signal on an exceeding of a threshold value with respect to the movement of the dam 500.

REFERENCE NUMERAL LIST

10 FMCW LiDAR distance measurement apparatus
12 laser
14 transmission signal
16 circulator
17 photodiode
18 mixer
20 transmission and reception optics
22 measurement zone
24 object
25 desired measurement zone
26 reception signal
28 portion of the transmission signal
29 preliminary mixed signal
30 oscillator frequency
32 local oscillator
34 peripheral system
36 mixed signal
38 ADC
40 digital mixed signal
42 control unit
44 frequency deviation
46 lower frequency
48 upper frequency
50 time interval Δt
52 beat frequency
54 APD
56 APD bias voltage
57 amplifier
400 crane system
402 gantry crane
404 crane bridge
406, 408 supports
410 crab
412 spreader
414 container
416 measurement distance
500 dam

What is claimed is:

1. An FMCW LiDAR distance measurement apparatus comprising:
   a light source that generates a frequency modulated transmission light beam as a transmission signal having a predetermined frequency deviation and transmits said frequency modulated transmission light beam into a measurement zone;
   a light receiver that is configured to receive light reflected by objects in the measurement zone as a reception signal; and
   a mixer that is configured to mix at least a portion of the transmission signal with the reception signal and with an oscillator frequency to generate a mixed signal,
   wherein the distance measurement apparatus is configured to adapt the oscillator frequency to a desired measurement zone,
   and wherein the mixer comprises an avalanche photodiode (APD), configured to perform the mixing of at least a portion of the transmission signal, and the reception signal and a bias voltage of the APD acted on by the oscillator frequency.

2. The FMCW LiDAR distance measurement apparatus in accordance with claim 1,
   wherein the light source is a laser.

3. The FMCW LiDAR distance measurement apparatus in accordance with claim 1,
   wherein the mixer comprises a photodiode, wherein the photodiode mixes at least a portion of the transmission signal and the reception signal and converts them into an electrical signal, wherein a beat frequency arises during the mixing and is mixed with the oscillator frequency.

4. The FMCW LiDAR distance measurement apparatus in accordance with claim 3,
   wherein the beat frequency is electrically mixed with the oscillator frequency.

5. The FMCW LiDAR distance measurement apparatus in accordance with claim 1,
   wherein the oscillator frequency is generated by a local oscillator and the distance measurement apparatus is configured to set the oscillator frequency based on a beat frequency expected for the desired measurement zone.

6. The FMCW LiDAR distance measurement apparatus in accordance with claim 1,
   wherein the distance measurement apparatus is configured to switch between at least two desired measurement zones during operation and to adapt the oscillator frequency to the currently valid desired measurement zone.

7. The FMCW LiDAR distance measurement apparatus in accordance with claim 3,
   wherein a distance range is defined by the desired measurement zone, said distance range having a minimum distance value with an associated minimum beat frequency and a maximum distance value with an associated maximum beat frequency, wherein the distance measurement apparatus is configured to select the oscillator frequency such that the oscillator frequency is greater than the maximum beat frequency or less than the minimum beat frequency.

8. The FMCW LiDAR distance measurement apparatus in accordance with claim 1,
wherein the frequency deviation of the frequency modulated transmission light beam has a periodic, piecewise linear shape.

9. The FMCW LiDAR distance measurement apparatus in accordance with claim 1,
wherein the distance measurement apparatus has an analog-to-digital converter, ADC, that converts the mixed signal into a digital mixed signal, wherein a mixing frequency of the mixed signal and/or of the digital mixed signal is determined in the frequency range, wherein a distance from an object in the measurement zone is determined based on the mixing frequency.

10. The FMCW LiDAR distance measurement apparatus in accordance with claim 9,
wherein the distance measurement apparatus is configured to convert the digital mixed signal into the frequency range by means of a fast Fourier transformation.

11. The FMCW LiDAR distance measurement apparatus in accordance with claim 9,
wherein the distance measurement apparatus is configured to adapt a modulation time duration, a measurement duration, a sampling frequency of the ADC, and the oscillator frequency to the desired measurement zone independently of one another or in dependence on one another.

12. The FMCW LiDAR distance measurement apparatus in accordance with claim 11,
wherein the distance measurement apparatus is configured to adapt the modulation time duration, the measurement duration, the sampling frequency of the ADC, and the oscillator frequency in a first phase to a larger desired measurement zone and in a subsequent second phase to a smaller desired measurement zone.

13. The FMCW LiDAR distance measurement apparatus in accordance with claim 1,
wherein the distance measurement apparatus is configured to set the desired measurement zone based on a received data signal.

14. The FMCW LiDAR distance measurement apparatus in accordance with claim 1,
wherein the received data signal is received from peripheral systems and/or sensors.

15. The FMCW LiDAR distance measurement apparatus in accordance with claim 1,
wherein the transmission signal and the reception signal are transmitted and/or received via a common optics, wherein the common optics comprises a circulator that guides the transmission light beam predominantly into the measurement zone and partly to the light receiver and that supplies the reflected light to the light receiver.

16. A crane system comprising a crane and an FMCW-LiDAR distance measurement apparatus, the FMCW-LiDAR distance measurement apparatus comprising:
a light source that generates a frequency modulated transmission light beam as a transmission signal having a predetermined frequency deviation and transmits said frequency modulated transmission light beam into a measurement zone;
a light receiver that is configured to receive light reflected by objects in the measurement zone as a reception signal; and
a mixer that is configured to mix at least a portion of the transmission signal with the reception signal and with an oscillator frequency to generate a mixed signal,
wherein the FMCW-LiDAR distance measurement apparatus is configured to adapt the oscillator frequency to a desired measurement zone, wherein the FMCW LiDAR distance measurement apparatus is attached in such a manner to detect a position of at least one movable part of the crane, wherein a crane control transmits a position of the movable part of the crane to the FMCW LiDAR distance measurement apparatus and the FMCW LiDAR distance measurement apparatus sets the desired measurement zone based on the position,
and wherein the mixer comprises an avalanche photodiode (APD), configured to perform the mixing of at least a portion of the transmission signal, and the reception signal and a bias voltage of the APD acted on by the oscillator frequency.

17. The crane system according to claim 16, wherein the crane is a gantry crane.

18. A construction structure comprising an FMCW LiDAR distance measurement apparatus comprising:
a light source that generates a frequency modulated transmission light beam as a transmission signal having a predetermined frequency deviation and transmits said frequency modulated transmission light beam into a measurement zone;
a light receiver that is configured to receive light reflected by objects in the measurement zone as a reception signal; and
a mixer that is configured to mix at least a portion of the transmission signal with the reception signal and with an oscillator frequency to generate a mixed signal,
wherein the FMCW LiDAR distance measurement apparatus is configured to adapt the oscillator frequency to a desired measurement zone,
wherein the FMCW LiDAR distance measurement apparatus is configured to repeatedly measure at least one position of a part of the construction structure,
and wherein the mixer comprises an avalanche photodiode (APD), configured to perform the mixing of at least a portion of the transmission signal, and the reception signal and a bias voltage of the APD acted on by the oscillator frequency.

19. An FMCW LiDAR distance measurement method in which
a frequency modulated transmission light beam is generated as a transmission signal and is transmitted into a measurement zone, wherein the transmission signal has a predetermined frequency deviation,
light reflected by objects in the measurement zone is received as a reception signal, and
at least a portion of the transmission signal is mixed with the reception signal and with an oscillator frequency to generate a mixed signal,
the oscillator frequency is adapted to a desired measurement zone,
wherein the mixer comprises an avalanche photodiode (APD), configured to perform the mixing of at least a portion of the transmission signal, and the reception signal and a bias voltage of the APD acted on by the oscillator frequency.

* * * * *